May 8, 1934.  L. A. SHARP ET AL  1,957,477
DETECTOR
Filed July 28, 1930   3 Sheets-Sheet 2

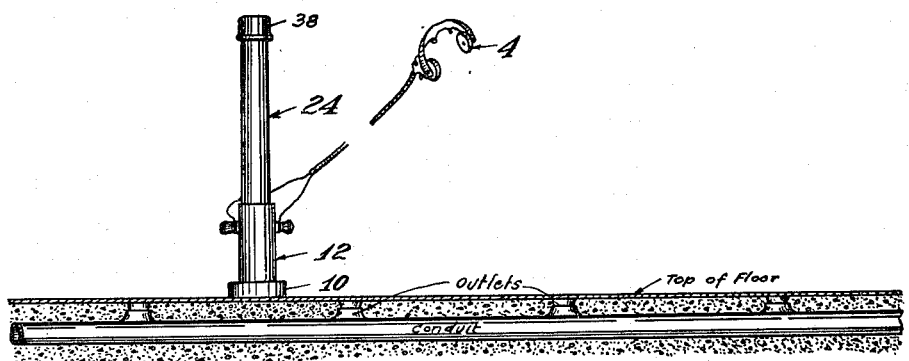
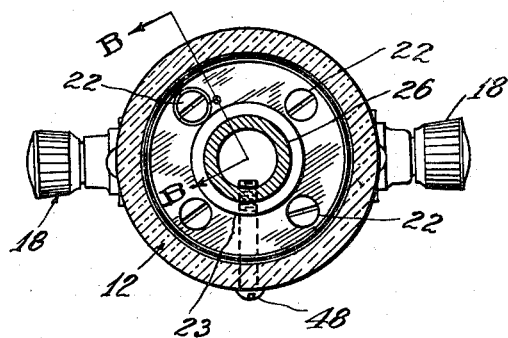
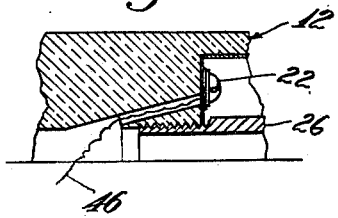

Patented May 8, 1934

1,957,477

UNITED STATES PATENT OFFICE 1,957,477

DETECTOR

L Alan Sharp and James M. G. Fullman, Pittsburgh, Pa., assignors to National Electric Products Corporation, Pittsburgh, Pa., a corporation of Delaware Application July 28, 1930, Serial No. 471,311

8 Claims. (Cl. 175—183)

This invention relates to detector devices and more in particular to such devices for locating electric metallic conduits and outlets therefor concealed in the floors or walls of buildings.

The primary object of this invention is to provide an electrically operated detector, whereby the duct outlets and the conduits therefor hidden under floors or partitions may be quickly found, for the purpose of establishing new connections in the general electrical distribution system.

Another object of this invention is to assist plumbers, pipe fitters, etc., in determining the location of pipe lines embedded in floors or partitions and to accordingly make plans or layouts for new additional pipe lines, etc., without interference and with the least amount of excavation or tearing out said floors or partitions.

A further object of this invention is to provide a detector which is of such reduced size and weight as to be easily carried about in one hand, which is entirely self-contained and very efficient in operation.

Additional features and advantages of this invention will appear in the following description considered in connection with the accompanying drawings forming part of this application.

In the drawings:

Fig. 5 represents a cross-section taken substantially on line A—A in Fig. 1.

Fig. 6 is a sectional view taken along line B—B in Fig. 5 and showing one of the electrical connections.

Figure 7 is a view showing the detector placed on a floor for locating outlets of an underfloor duct system.

Figure 2:
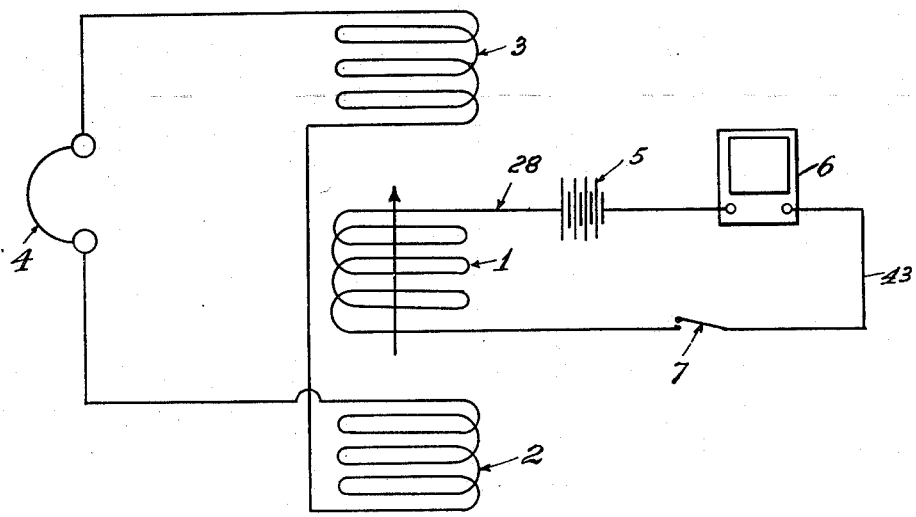
Fig. 2 is a diagrammatic representation of the electric wiring connections of the device.
Figure 3:
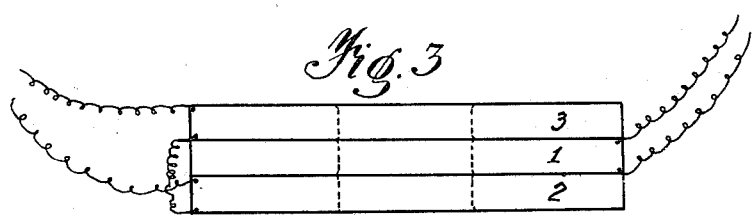
Fig. 3 is a side elevation showing the arrangement of the primary and secondary coils used in Fig. 2.
Figure 4:
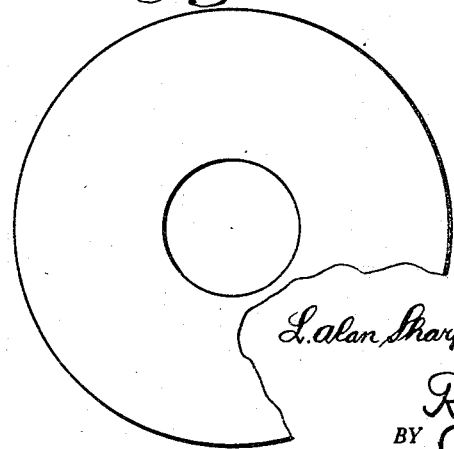
Fig. 4 is a fragmentary top plan view of the coils shown in Fig. 3.

Referring in particular to Figs. 2 and 3 the operation of this detector is based on the action of a primary coil 1 supplied with alternating or pulsating current upon two equally spaced and similar secondary coils 2 and 3 having the same inductive values and electrically connected so as to oppose, or buck, each other. In the circuit of the secondary coils is introduced any desired type of indicating or measuring device, such as a galvanometer, telephone, electric light or bell, voltmeter, neon tubes, etc. On account of its sensitiveness and portability, we prefer to use a head-telephone set suggested by the reference number 4 in Fig. 2. In the latter, are also shown an electric battery 5, a buzzer or interrupter 6 of any suitable commercial type which changes the continuous current of the battery into a pulsating current and a switch 7 to make or break the current in the primary coil.

Under normal operation there will be a transfer of energy, by induction, from the primary coil 1 to both secondary coils 2, 3. However, due to the fact, that both secondary coils possess, as nearly as possible, the same electrical characteristics, are equally spaced from the primary coil and are connected in opposition to each other, the identical currents induced therein will simply offset or neutralize each other and no current will flow to the external circuit, represented in this embodiment by the head telephone. Hence no pronounced sounds will be perceived in the latter.

When an electrically conductive material either magnetic or nonmagnetic, approaches the magnetic field set up within and around the coil assembly, the current-characteristics in one of the secondary coils, or both, are changed depending on the material approached and on the relative positions of said material to the coils. For the sake of simplicity it will be assumed that the influence of the approached material on the upper secondary coil is negligible as compared to that on the lower secondary coil 2, on account of its greater distance from said material.

Assuming now that a magnetic conductive material, such as iron, be brought into the proximity of the secondary coil 2, the reluctance of the magnetic circuit in the direction of said coil is reduced because iron, due to its natural characteristics is many times more conductive to magnetic lines of force, or flux, than air. As the distance between the iron body and the coil 2 decreases, the current in the external circuit increases, and, in the present embodiment, the sound produced by the telephone will increase according to the vicinity and mass of said iron body. In other words, the presence of iron, or other magnetic material near the secondary coil 2 tends towards increasing the magnetic flux through coil 2 with respect to coil 3, which results in an un-balanced condition of currents in said two coils which is registered in the telephone or other registering device.

When a non-magnetic, electric conductive body, such as the bronze cap of a conduit outlet, is brought into the magnetic field and into close vicinity of the coil 2, this body absorbs energy from the field and causes an un-balanced condition in the opposite direction. That is to say, the resultant current in coil 2 is less than in coil 3, and the variation is measured relatively on the indicating device in the exterior circuit of the secondary coils.

This difference in action of magnetic and non-magnetic bodies on the magnetic field of the coils is very discernible in the indicating device used and, after a little practice, a person can easily determine the material nature of a hidden body, and its relative distance and size.

A stated heretofore, for practical reasons we have used a telephone head set as an indicating device with our detector.

Figure 1:
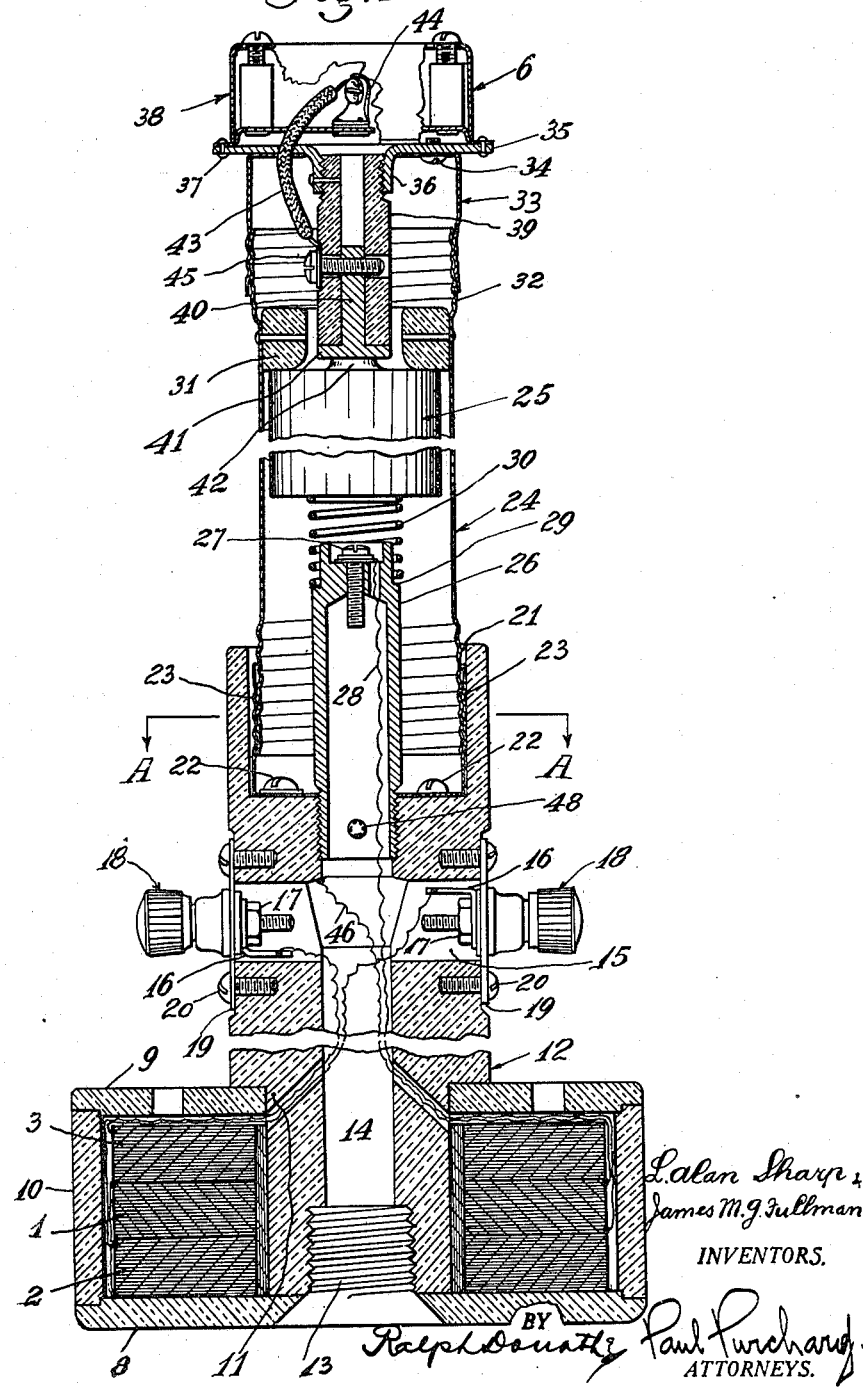
Fig. 1 is a longitudinal sectional view taken substantially through the median plane of the device.

The construction of the latter is especially disclosed in Figs. 1 and 5. As shown therein, primary coil 1 and the secondary coils 2, 3 are fully enclosed and protected in a housing made of strong electrically non-conductive and non-magnetic material. This housing forms the base of the detector device and comprises a circular bottom plate 8, a similar top plate 9 and the annular shell 10.

The top plate has a large central aperture which receives the reduced core 11 of the vertical post or handle 12 also of nonconductive material, and the parts 8, 9 and 10 are rigidly clamped together and to the post by means of a non-metallic threaded plug 13 screwed into a suitably threaded aperture in the core 11.

The post 12 has a central longitudinal aperture 14 through which are passed the various wire-connections from the primary and secondary coils. A transverse aperture 15 is drilled through the post, in communication with the longitudinal aperture, and in the former are situated the cleats 16 and nuts 17 of the binding-posts 18 to which the indicating devices; i. e. the telephones, are connected. These binding-posts are mounted over the aperture 15 by means of the plates 19 and screws 20.

In the upper portion of the post 12 is an enlarged hole 21 in the flat bottom of which is secured by means of screws 22 the threaded cap 23 into which is screwed the lower end of the tubing 24 forming the receptacle for the dry-cell battery 25 which supplies the detector with the required electric energy. One of the screws 22 serves also as binding-post for the end-wire 46 of the primary coil.

The top end of the central aperture is also threaded to receive the partly hollowed terminal 26 the upper end of which is countersunk to receive a binding screw 27 to which one end wire 28 of the primary coil is secured. This terminal is also reduced to produce a shoulder 29 upon which rests a coil spring 30 acting on the lowermost of the battery cells 25 to resiliently hold them together in proper electrical contact relation and also force the upper cell against a collar 31 of insulating material riveted to the tubing 24. A screw 48 is used to lock the terminal 26 in position.

The upper end of the tubing is threaded, as at 32, to receive the top screw-cap 33 upon which is secured by screws 34 a circular metal base 35 having an inwardly threaded and, preferably, integral hub 36.

On this base is securely held, such as by rivets 37 the box of a buzzer 6 of usual construction.

To the hub 36 is screwed a tube 39 of insulating material in the lower end of which is inserted the stem 40 of the contact button 41 which engages the upper pole 42 of the dry-cell battery. The contact button and said pole form together the switch 7 indicated in Fig. 2.

The electrical connection between the contact-button 41 and the buzzer 38 is obtained by means of a wire 43 connected at the top to the binding post 44 of the buzzer and at the bottom to a contact screw 45 engaging the stem of the contact-button and securing same simultaneously to the tube 39.

By unscrewing the cap 33 the circuit from the battery through the primary coil and the buzzer is broken, and vice-versa, by screwing down the cap, the battery circuit is closed.

The operation and application of this device may be succinctly described as follows:

Assuming, for instance, that an outlet for an under-floor conduit (Fig. 7) is to be located for the purpose of making a new electrical connection, the operator first connects the telephone headset 4 to the binding posts 18, then establishes the electric circuit of the battery by screwing down the cap 33 until proper contact with the upper pole of the battery is made, and finally, moves the detector across the floor. If no metal body is near the detector, no sounds will be heard in the earphones or, at the most, only a slight sound, or hum, may be perceived due to the practical impossibility of making the two oppositely connected secondary coils theoretically alike in electrical characteristics. The detector is then moved about the floor until a special sound is heard. This, generally, first indicates the presence of a nearby buried conduit. The detector is then further moved across the floor, in line with the conduit, until a more definite sound or tone is discerned, which indicates the correct location of the duct outlet. The top floor covering of the latter is then cut away, the cover or plug of the outlet is removed and a service fitting is installed.

As stated heretofore, an operator can readily determine by the sound emitted the relative proximity and size of the hidden metal body and whether the latter be made of magnetic or non-magnetic metal. Also, by establishing the course of the various pipes and conduits embedded in a floor, a plumber or pipe fitter can easily determine unoccupied spaces in the floor in which to install new piping and fittings without interference and with the least amount of excavation or tearing up in the floor.

When the dry cell (or storage) battery is worn out, a new one can be inserted in the tubing 24 by unscrewing the latter from the stationary threaded cap 23 in the post 12, as will be readily understood.

The detector, as described hereinabove, forms a portable and fully self-contained device on account of carrying its own source of electric current within itself, i. e. the dry-cell or storage battery. However, where a circuit of alternating electric current of suitable voltage is available, the primary coil might be connected directly to said circuit and the detector simplified and made lighter by eliminating the battery, buzzer and correlated parts, in a manner that will be readily conceived by persons versed in the art. Also, if found advisable, the battery, buzzer and switch could be severally placed in separate compartments, instead of in a single unit, to lighten the detector, reduce its size and make it more appropriate for application in crowded or hardly accessible spaces.

While we have illustrated and described herein the present embodiment of a portable detector of our invention, and one which we have found by actual use to be very practical, it may be found desirable after continued experience to make changes in the construction and arrangement of the details of this invention, and we intend to include in this application all such variations as fall within the scope of the appended claims.

We claim:

1. In a device for detecting a hidden metallic body, a primary coil; a source of direct electric current therefor; a pair of secondary coils having substantially identical electric characteristics connected oppositely in series and severally positioned in uniform coaxial relation above and below the primary coil; an electrically actuated registering device connected serially with the secondary coils; a common non-metallic housing for said coils; a non-metallic post positioned normally to said housing; unitary non-metallic means for securing said post and housing together; a container for said source of electric energy positioned at the other end of the post; interrupter means supported by the container adapted to change said direct current into fluctuating current; electrical connections to connect the source of electric current and the interrupter means in series with the primary coil, and means to selectively make and break the circuit of the primary coil.

2. In a device for detecting a hidden metallic body, a primary coil; a source of direct electric current therefor; a pair of secondary coils having susbtantially identical electrical characteristics connected oppositely in series and severally positioned in uniform coaxial relation above and below the primary coil; an electrically actuated registering device connected serially with the secondary coils; a common non-metallic housing for said coils; a non-metallic post positioned normally to said housing; unitary non-metallic means for securing said post and housing together; a container for said source of electric current positioned at the other end of the post, a cap for said container longitudinally movable thereon; an interrupter means supported by said cap adapted to change said direct current into fluctuating current, electrical connections to connect the source of current and interrupter means in series with the primary coil, and means operable by said container-cap to selectively make and break the circuit of the primary coil.

3. In a device for detecting a hidden metallic body, comprising an insulated housing, two secondary coils close coupled with a primary coil, said secondary coils disposed on each side of said primary coil and inclosed in said insulated housing, a hollow bar centrally secured in said housing; a hollow container handle removably inserted in said hollow bar and adapted to hold a source of direct electric current, means for registering the variations produced in the electro-magnetic field of said primary and secondary coils by the presence of said metallic body; a container cap; means to periodically interrupt the source of continuous current and means for making and breaking the primary circuit for the purpose of starting and stopping the operation of the device.

4. In a device for detecting a hidden metallic body, comprising an insulated housing, two secondary coils close coupled with a primary coil, said secondary coils disposed on each side of said primary coil and inclosed in said insulated housing, a hollow bar centrally secured in said housing; a hollow container handle removably inserted in said hollow bar and adapted to hold a source of direct electric current, means for registering the variations produced in the electro-magnetic field of said primary and secondary coils by the presence of said metallic body; a container cap; means to periodically interrupt the source of continuous current and means for making and breaking the primary circuit for the purpose of starting and stopping the operation of the device.

5. In a device for detecting a hidden metallic body of the self-contained type, comprising a tubular receptacle provided with a top cap; a single primary coil; a source of fluctuating electric current therefor; a pair of secondary coils in inductive relation with the primary coil, means for registering the variations produced in the electro-magnetic field of said coils by the presence of said metallic body and means to selectively make and break said fluctuating electric current, said means operable by said top cap.

6. In a device for detecting a hidden metallic body of the self-contained type, comprising a tubular receptacle provided with a top cap; a single primary coil; a source of fluctuating electric current therefor; a pair of secondary coils having substantially identical characteristics and in abutment with said single primary coil, means for registering the variations produced in the electro-magnetic field of said coils by the presence of said metallic body and means to selectively make and break said fluctuating electric current, said means operable by said top cap.

7. In a device for detecting a hidden metallic body of the self-contained type, comprising an insulated housing, two secondary coils close coupled with a primary coil, said secondary coils disposed on each side of said primary coil and inclosed in said insulated housing, a hollow bar centrally secured in said housing; a tubular receptacle handle removably inserted in said hollow bar and adapted to hold a source of direct electric current, means for registering the variations produced in the electro-magnetic field of said primary and secondary coils by the presence of said metallic body; a top screw-cap on said tubular receptacle handle, a buzzer positioned on said top screw-cap and means to selectively make and break said fluctuating current.

8. In a device for detecting a hidden metallic body of the self-contained type, comprising an insulated housing, two secondary coils close coupled with a primary coil, said secondary coils disposed on each side of said primary coil and inclosed in said insulated housing, a hollow bar centrally secured in said housing; a tubular receptacle handle removably inserted in said hollow bar and adapted to hold a source of direct electric current, means for registering the variations produced in the electro-magnetic field of said primary and secondary coils by the presence of said metallic body; a top screw-cap on said tubular receptacle handle, a buzzer positioned on said top screw-cap and means to selectively make and break said fluctuating current, said means operable by said top screw-cap.

L ALAN SHARP.
JAMES M. G. FULLMAN.